United States Patent
Li et al.

(10) Patent No.: US 11,564,169 B2
(45) Date of Patent: Jan. 24, 2023

(54) WAKE-UP-RADIO LINK ADAPTATION

(71) Applicant: Apple Inc., Cupertino, CA (US)

(72) Inventors: Guoqing Li, Cupertino, CA (US); Oren Shani, Saratoga, CA (US); Yong Liu, Campbell, CA (US); Xiaowen Wang, Cupertino, CA (US); Yoel Boger, Shoham (IL); Christiaan A. Hartman, San Jose, CA (US); Christian W. Mucke, Cupertino, CA (US); Tushar R. Shah, Cupertino, CA (US); Matthew L. Semersky, San Jose, CA (US); Josef Peery, Kadima (IL)

(73) Assignee: Apple Inc., Cupertino, CA (US)

( * ) Notice: Subject to any disclaimer, the term of this patent is extended or adjusted under 35 U.S.C. 154(b) by 450 days.

(21) Appl. No.: 16/012,935

(22) Filed: Jun. 20, 2018

(65) Prior Publication Data

US 2019/0014541 A1  Jan. 10, 2019

Related U.S. Application Data

(60) Provisional application No. 62/528,755, filed on Jul. 5, 2017.

(51) Int. Cl.
*H04W 52/02* (2009.01)
*H04L 25/02* (2006.01)
(Continued)

(52) U.S. Cl.
CPC ........ *H04W 52/0229* (2013.01); *H04B 1/005* (2013.01); *H04B 17/336* (2015.01);
(Continued)

(58) Field of Classification Search
CPC ......... H04W 52/0229; H04W 52/0216; H04W 52/0235; H04W 84/12; H04B 17/336; H04B 1/005; H04L 25/0202
(Continued)

(56) References Cited

U.S. PATENT DOCUMENTS

| | | | |
|---|---|---|---|
| 2013/0124883 A1* | 5/2013 | Addepalli | G06F 1/28 713/310 |
| 2015/0071150 A1 | 3/2015 | Bradley | |

(Continued)

OTHER PUBLICATIONS

Minyoung Park et al.; "Proposal for LP-WUR (Low-Power Wake-Up Receiver) Study Group"; IEEE 802.11-16/0605r3; May 17, 2016; 14 pages.

Po-Kai Huang et al.;"WUR Negotiation and Acknowledgement Procedure Follow up"; IEEE 802.11-17/0342r4; Mar. 12, 2017; 17 pages.

(Continued)

*Primary Examiner* — Mohammed S Chowdhury
(74) *Attorney, Agent, or Firm* — Kowert, Hood, Munyon, Rankin & Goetzel, P.C.

(57) ABSTRACT

An interface circuit in a device, e.g., an access point, may perform link adaptation. During operation, the interface circuit may provide a wake-up frame, e.g., a LP-WUR packet, associated with a channel in a band of frequencies, where the wake-up frame is intended for a wake-up radio in a recipient device. Then, the interface circuit may receive, from the recipient device, feedback information associated with a second channel in a second band of frequencies, where the feedback information is associated with a main radio in the recipient device. Based at least in part on the feedback information, the interface circuit may estimate one or more communication metrics associated with the channel in the band of frequencies. Moreover, based at least in part on the one or more communication metrics, the interface circuit may determine a data rate for use in communication via the channel in the band of frequencies.

21 Claims, 8 Drawing Sheets

(51) Int. Cl.
　　　*H04B 17/336*　　(2015.01)
　　　*H04B 1/00*　　　(2006.01)
　　　*H04W 84/12*　　(2009.01)
(52) U.S. Cl.
　　　CPC ..... *H04L 25/0202* (2013.01); *H04W 52/0216* (2013.01); *H04W 52/0235* (2013.01); *H04W 84/12* (2013.01)
(58) Field of Classification Search
　　　USPC ........................................................ 370/311
　　　See application file for complete search history.

(56) References Cited

U.S. PATENT DOCUMENTS

| | | | |
|---|---|---|---|
| 2016/0337973 | A1 | 11/2016 | Park |
| 2016/0374021 | A1* | 12/2016 | Alpman ............ H04W 52/0229 |
| 2017/0055289 | A1* | 2/2017 | Chang ............... H04W 74/0816 |
| 2017/0171815 | A1* | 6/2017 | de Jager ........... H04W 52/0216 |
| 2017/0332327 | A1* | 11/2017 | Fang ..................... H04L 5/0007 |
| 2018/0041961 | A1 | 2/2018 | Huang |
| 2018/0077641 | A1 | 3/2018 | Yang |
| 2018/0309538 | A1* | 10/2018 | Verma ................... H04L 1/0023 |
| 2020/0045635 | A1* | 2/2020 | Lin ....................... H04W 52/12 |

OTHER PUBLICATIONS

Office Action, Korean Patent Application No. 10-2018-0076249, dated Jul. 22, 2019, four pages.
Extended European Search Report, Application No. 18181250.4, dated Nov. 15, 2018, seven pages.

* cited by examiner

WAKE-UP-RADIO LINK ADAPTATION

CROSS-REFERENCE TO RELATED APPLICATION

This application claims the benefit of U.S. Provisional Application No. 62/528,755, entitled "Wake-Up Radio Link Adaptation, by Guoqing Li, et al., filed Jul. 5, 2017, the contents of which are hereby incorporated by reference.

FIELD

The described embodiments relate, generally, to wireless communications among electronic devices, and techniques for adapting a link associated with a low-power wake-up radio.

BACKGROUND

Many electronic devices communicate with each other using wireless local area networks (WLANs), such as those based on a communication protocol that is compatible with an IEEE 802.11 standard (which is sometimes referred to as 'Wi-Fi'). However, a radio in an electronic device that communicates using wireless communication in a WLAN may consume a significant amount of power.

In order to address this challenge, a new radio technology called Low Power Wake Up Radio (LP-WUR) is being considered. The LP-WUR may be a companion to the main Wi-Fi radio in the electronic device. Notably, by using the LP-WUR, the electronic device may turn off its main radio and may wake up the main radio in response to the LP-WUR receiving an LP-WUR packet from an access point. For example, the access point may send the LP-WUR packet when there is a down-link packet for the electronic device.

SUMMARY

A first group of embodiments relate to an electronic device that performs link adaptation. This electronic device may include a node that can be communicatively coupled to an antenna, and an interface circuit communicatively coupled to the node and that communicates with a recipient electronic device. During operation, the interface circuit provides, to the node, a wake-up frame associated with a channel in a band of frequencies, where the wake-up frame is intended for a wake-up radio in the recipient electronic device. Then, the interface circuit receives, from the node, feedback information associated with a second channel in a second band of frequencies, wherein the feedback information is associated with a main radio in the recipient electronic device. Based at least in part on the feedback information, the interface circuit estimates one or more communication metrics associated with the channel in the band of frequencies. Moreover, based at least in part on the one or more communication metrics, the interface circuit determines a data rate for use in communication via the channel in the band of frequencies.

Note that the electronic device may include an access point.

Moreover, the wake-up frame may include a Low Power Wake Up Radio (LP-WUR) packet. Furthermore, the wake-up frame may be compatible with an IEEE 802.11 communication protocol.

Additionally, the feedback information may, at least in part, include one or more second communication metrics associated with the channel in the band of frequencies, and the interface circuit may determine the data rate based at least in part on the one or more second communication metrics. Thus, communication performance associated with the channel in the band of frequencies may be estimated by the electronic device, the recipient electronic device or both.

For example, the feedback information may include one or more of: a received signal strength at the wake-up radio; a link margin associated with the channel in the band of frequencies; a pathloss associated with the channel in the band of frequencies; and a transmit power of the main radio in the recipient electronic device.

In some embodiments, the channel in the band of frequencies and the second channel in the second band of frequencies are different.

Moreover, when the interface circuit does not receive the feedback information within a time interval of providing the wake-up frame, the interface circuit may reduce the data rate for use in communication via the channel in the band of frequencies.

Furthermore, the interface circuit may determine the data rate based at least in part on a predefined list of data rates as a function of at least one of the one or more communication metrics. For example, the predefined list may include data rates as a function of signal-to-noise ratios associated with the channel in the band of frequencies.

Note that the one or more communication metrics may include at least one of: a signal-to-noise ratio associated with the channel in the band of frequencies, the received signal strength at the recipient electronic device and the pathloss.

Other embodiments provide an interface circuit in the electronic device.

Other embodiments provide a computer-readable storage medium for use with the interface circuit in the electronic device. When program instructions stored in the computer-readable storage medium are executed by the interface circuit, the program instructions may cause the electronic device to perform at least some of the aforementioned operations of the electronic device.

Other embodiments provide a method for performing the link adaptation. The method includes at least some of the aforementioned operations performed by the interface circuit in the electronic device.

A second group of embodiments relate to the recipient electronic device that provides the feedback information from the first group of embodiments. This recipient electronic device may include a node that can be communicatively coupled to an antenna, and an interface circuit communicatively coupled to the node and that communicates with the electronic device. The interface circuit may include the wake-up radio and the main radio. During operation, the wake-up radio receives, from the node, the wake-up frame associated with the channel in the band of frequencies. In response to the wake-up frame, the wake-up radio provides, to the main radio, a wake-up signal that transitions the main radio from a low-power mode to a higher-power mode. Then, the main radio provides, to the node, the feedback information intended for the electronic device, wherein the feedback information is associated with the second channel in the second band of frequencies.

In some embodiments, prior to providing the feedback information, the interface circuit determines the one or more second communication metrics associated with the channel in the band of frequencies. For example, the feedback information may include one or more of: the received signal strength at the wake-up radio; the link margin associated with the channel in the band of frequencies; the pathloss associated with the channel in the band of frequencies; and the transmit power of the main radio.

Other embodiments provide an interface circuit in the recipient electronic device.

Other embodiments provide a computer-readable storage medium for use with the interface circuit in the recipient electronic device. When program instructions stored in the computer-readable storage medium are executed by the interface circuit, the program instructions may cause the recipient electronic device to perform at least some of the aforementioned operations of the recipient electronic device.

Other embodiments provide a method for providing the feedback information. The method includes at least some of the aforementioned operations performed by the interface circuit in the recipient electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
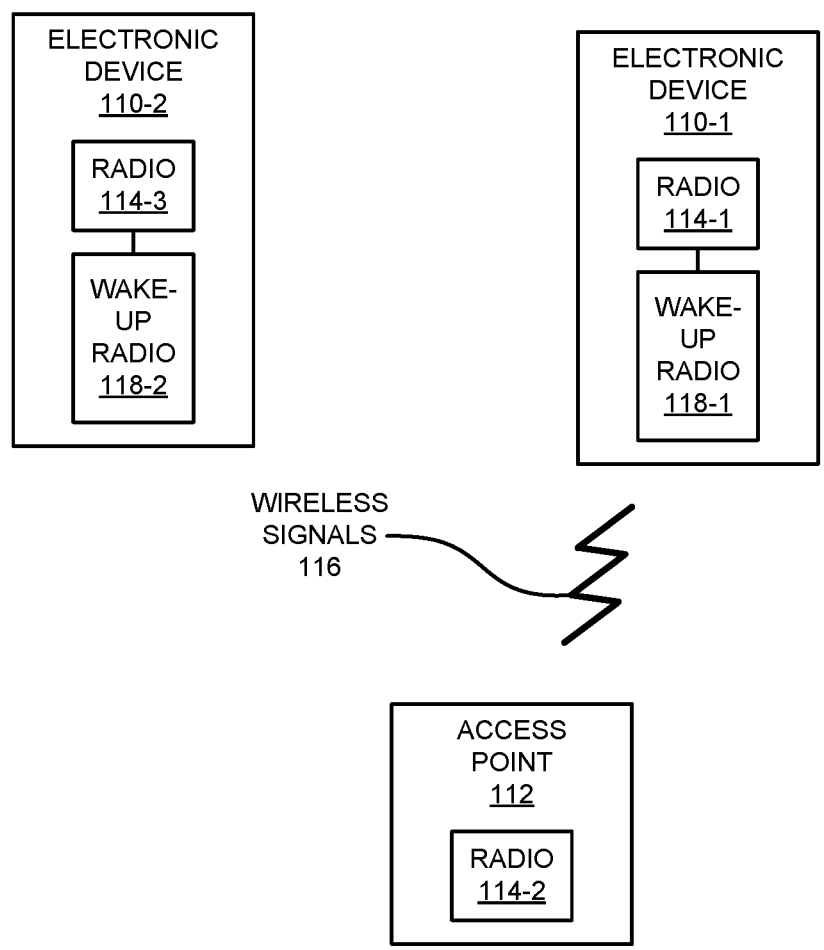
FIG. 1 is a block diagram illustrating an example of electronic devices communicating wirelessly.

An interface circuit in an electronic device (such as an access point) may perform link adaptation. During operation, the interface circuit may provide a wake-up frame (such as a LP-WUR packet) associated with a channel in a band of frequencies, where the wake-up frame is for a wake-up radio in a recipient electronic device. Then, the interface circuit may receive, from the recipient electronic device, feedback information associated with a second channel in a second band of frequencies, where the feedback information is associated with a main radio in the recipient electronic device. Based at least in part on the feedback information, the interface circuit may estimate one or more communication metrics associated with the channel in the band of frequencies. Moreover, based at least in part on the one or more communication metrics, the interface circuit may determine a data rate for use in communication via the channel in the band of frequencies.

In some embodiments, the feedback information may, at least in part, include one or more second communication metrics associated with the channel in the band of frequencies, and the interface circuit may determine the data rate based at least in part on the one or more second communication metrics. Thus, communication performance associated with the channel in the band of frequencies may be estimated by the electronic device, the recipient electronic device or both. Note that the interface circuit may determine the data rate based at least in part on a predefined list of data rates as a function of at least one of the one or more communication metrics. For example, the predefined list may include data rates as a function of signal-to-noise ratios associated with the channel in the band of frequencies.

Furthermore, the recipient electronic device may include an interface circuit that includes the wake-up radio (such as the LP-WUR) and the main radio. During operation, the wake-up radio may receive the wake-up frame associated with the channel in the band of frequencies, where the wake-up frame is associated with the electronic device. Then, the wake-up radio may provide, to the main radio, a wake-up signal that transitions the main radio from a low-power mode to a higher-power mode based at least in part on the wake-up frame. Moreover, the main radio may provide, to the node, the feedback information intended for the electronic device, where the feedback information is associated with the second channel in the second band of frequencies.

By adapting the link, this communication technique may facilitate improved communication performance between the electronic device and the recipient electronic device in the channel in the band of frequencies. Consequently, the communication technique may reduce delays associated with the communication with the wake-up radio, which may improve the communication performance of the electronic device and the recipient electronic device in the second channel in the second band of frequencies. Thus, the communication technique may improve the user experience when using the electronic device or the recipient electronic device, and therefore may increase customer satisfaction and retention.

Note that the communication technique may be used during wireless communication between electronic devices in accordance with a communication protocol, such as a communication protocol that is compatible with an IEEE 802.11 standard (which is sometimes referred to as Wi-Fi). In some embodiments, the communication technique is used with IEEE 802.11BA and/or IEEE 802.11ax, which are used as illustrative examples in the discussion that follows. However, this communication technique may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth® Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN) a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations, client electronic devices, or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

As described further below with reference to FIG. 8, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112 to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 and access point 112, respectively. For example, as noted previously, electronic device 110-1 and access point 112 may exchange packets using a Wi-Fi communication protocol in a WLAN. As illustrated further below with reference to FIGS. 2-4, radio 114-1 may receive wireless signals 116 that are transmitted by radio 114-2. Alternatively, radio 114-1 may transmit wireless signals 116 that are received by radio 114-2. However, as described further below with reference to FIG. 5, radio 114-1 consumes additional power in a higher-power mode. If radio 114-1 remains in the higher-power mode even when it is not transmitting or receiving packets, the power consumption of electronic device 110-1 may be needlessly increased. Consequently, electronic devices 110 may include wake-up radios 118 that listen for and/or receive wake-up frames (and/or other wake-up communications) from access point 112. When a particular electronic device (such as electronic device 110-1) receives a wake-up frame, wake-up radio 118-1 may selectively wake up radio 114-1, e.g., by providing a wake-up signal that selectively transition radio 114-1 from a low-power mode to the higher-power mode.

During operation, access point 112 (such as radio 114-2) may determine whether to send a wake-up frame to one or more recipient electronic devices (such as electronic device 110-1) with information that specifies that one or more recipient electronic devices transition from the low-power mode. For example, access point 112 may determine whether to send a wake-up frame to electronic device 110-1 when there is downlink traffic for electronic device 110-1. Then, radio 114-2 may provide a wake-up frame (such as a LP-WUR packet) for the one or more recipient electronic devices (and, notably, for one or more wake-up radios 118). This wake-up frame may be associated with a channel in a band of frequencies (e.g., radio 114-2 may transmit the wake-up frame in the channel). For example, the wake-up frame may be communicated in a narrow band (or sub-channel) or multiple narrow bands in, e.g., a 20 MHz channel.

After receiving the wake-up frame, wake-up radio 118-1 may provide, to radio 114-1, a wake-up signal that transitions radio 114-1 from the low-power mode to the higher-power mode. Alternatively, when the information in the wake-up frame does not specify electronic device 110-1, wake-up radio 118-1 may take no further action, e.g., radio 114-1 may remaining in the low-power mode. More generally, in some embodiments after wake-up radio 118-1 receives the wake-up frame, the wake-up radio 118-1 may analyze the information in the wake-up frame to determine if radio 114-1 should transition from the low-power mode. Thus, in the embodiments, the 'intelligence' as to whether to transition from the low-power mode in the communication technique may be implemented by access point 112 (such as when access point 112 determines whether it will send the wake-up frame to electronic device 110-1) and/or in electronic device 110-1 (which may analyze the information included in the wake-up frame).

Then, when radio 114-1 transitions to the higher-power mode, radio 114-1 may provide feedback information to access point 112, e.g., the feedback information may be included in a feedback frame. Note that the feedback information may be associated with a second channel in a second band of frequencies (e.g., radio 114-1 may transmit the feedback frame in the second channel). This second channel may be different than the channel.

In some embodiments, prior to providing the feedback information, electronic device 110-1 (such as wake-up radio 118-1 and/or radio 114-1) may determine one or more second communication metrics associated with the channel in the band of frequencies. For example, as described further below with reference to FIG. 7, the feedback information may include: a received signal strength at wake-up radio 118-1 in the channel in the band of frequencies (such as a received signal strength indicator or RSSI); a link margin associated with the channel in the band of frequencies; a pathloss associated with the channel in the band of frequencies; and/or a transmit power of radio 114-1 in the second channel in the second band of frequencies.

Next, radio 114-2 may receive the feedback information associated with the second channel in the second band of frequencies. Based at least in part on the feedback information, radio 114-2 may estimate one or more communication metrics associated with the channel in the band of frequencies. Because the channel in the band of frequencies may be different than the second channel in the second band of frequencies, the estimation may involve radio 114-2 estimating the one or more communication metrics in a different band of frequencies and/or at wake-up radio 118-1. For example, the one or more communication metrics may include: a signal-to-noise ratio associated with the channel in the band of frequencies, the received signal strength at radio 118-1 in the channel in the band of frequencies and/or the pathloss associated with the channel in the band of frequencies.

Moreover, based at least in part on the one or more communication metrics, radio 114-2 may determine a data rate for use in communication via the channel in the band of frequencies. For example, radio 1114-2 may determine the data rate based at least in part on a predefined list of data rates as a function of at least one of the one or more communication metrics. Notably, the predefined list may include data rates as a function of signal-to-noise ratios associated with the channel in the band of frequencies, which may be determined experimentally and/or may be simulated results. As noted previously, in some embodiments the feedback information may, at least in part, include one or more second communication metrics associated with the channel in the band of frequencies. Therefore, radio 114-2 may determine the data rate based at least in part on the one or more second communication metrics. Thus, communication performance associated with the channel in the band of frequencies may be estimated by access point 112, electronic device 110-1 or both.

In some embodiments, when radio 114-2 does not receive the feedback information within a time interval of providing the wake-up frame (such as a time interval of, e.g., hundreds of microseconds to several milliseconds, which are nonlimiting numerical examples), radio 114-2 may reduce the data rate for use in communication via the channel in the band of frequencies.

Note that wake-up radio 118-1 may operate continuously or in a duty-cycle mode. For example, wake-up radio 118-1 may wake up to or transition to the higher-power mode from the low-power mode to receive the wake-up frame. In some embodiments, radio 114-2 may provide wake-up frames once, as needed (such as when there is downlink traffic) or periodically (such as within an associated keep-alive interval of access point 112, e.g., a keep-alive interval of between 1 and 10 s).

In these ways, the communication technique may allow electronic devices 110 and access point 112 to communicate efficiently (such as with low latency and with an optimal data rate) using wake-up radios 118, while significantly reducing the power consumption associated with radios 114 in electronic devices 110. These capabilities may improve the user experience when using electronic devices 110.

Note that access point 112 and at least some of electronic devices 110 may be compatible with an IEEE 802.11 standard that includes trigger-based channel access (such as IEEE 802.11ax). However, access point 112 and at least this subset of electronic devices 110 may also communicate with one or more legacy electronic devices that are not compatible with the IEEE 802.11 standard (i.e., that do not use multi-user trigger-based channel access). In some embodiments, at least a subset of electronic devices 110 use multi-user transmission (such as orthogonal frequency division multiple access or OFDMA). For example, radio 114-2 may provide a trigger frame for the subset of recipient electronic devices. This trigger frame may be provided after a time delay (such as a time delay between, e.g., 10 and 300 ms), so that radio 114-1 has sufficient time to transition to the higher-power mode. Moreover, after radio 118-1 receives the wake-up frame and radio 114-1 transitions to the higher-power mode, radio 114-1 may provide a group acknowledgment to radio 114-2. For example, radio 114-1 may provide the acknowledgment during an assigned time slot and/or in an assigned channel in the group acknowledgment. However, in some embodiments the one or more recipient electronic devices may individually provide acknowledgments to radio 114-2. Thus, after radio 118-1 receives the wake-up frame and radio 114-1 transitions to the higher-power mode, radio 114-1 (and, more generally, the main radios in the one or more recipient electronic devices) may provide an acknowledgment to radio 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication technique may be characterized by a variety of communication-performance metrics. For example, the communication-performance metric may include: a RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Figure 2:
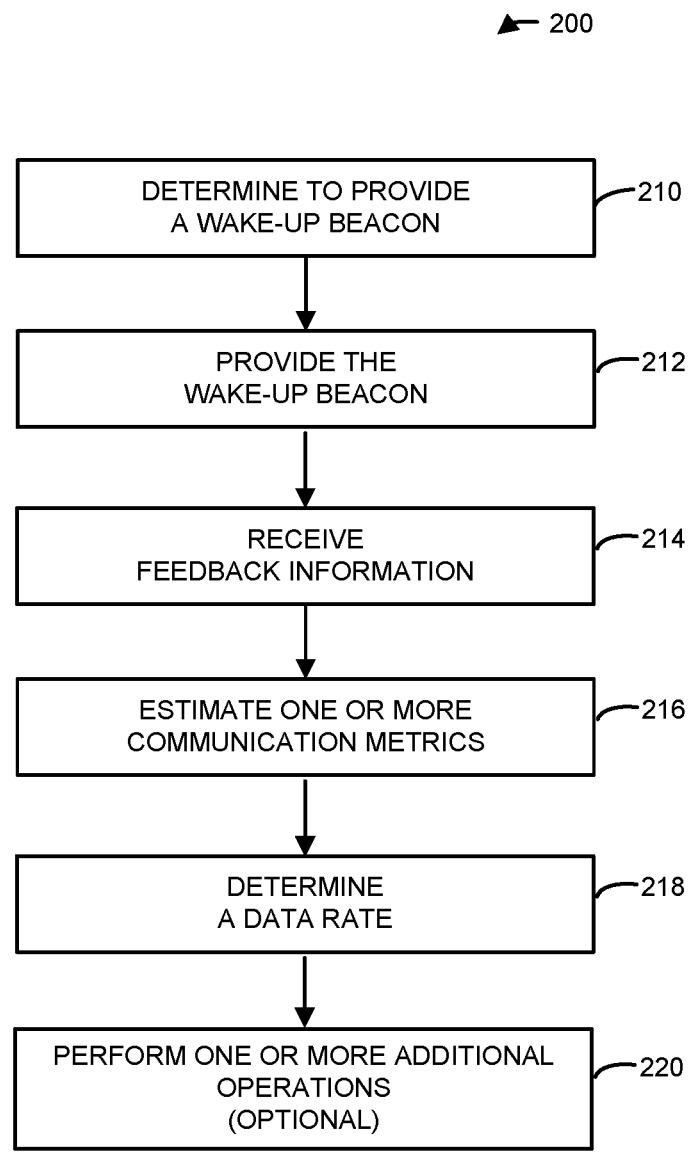
FIG. 2 is a flow diagram illustrating an example of a method for performing link adaptation using one of the electronic devices in FIG. 1.

FIG. 2 presents a flow diagram illustrating an example method 200 for performing link adaptation. This method may be performed by an electronic device, such as an interface circuit in access point 112 in FIG. 1. During operation, the interface circuit may optionally determine to provide the wake-up frame (operation 210) for a wake-up radio in a recipient electronic device. For example, the interface circuit may determine to provide the wake-up frame when there is downlink traffic (such as data associated with a service) for the recipient electronic device. Then, the interface circuit may provide the wake-up frame (operation 212) associated with the channel in the band of frequencies.

Note that the electronic device may include an access point. Moreover, the wake-up frame may include a LP-WUR packet. Furthermore, the wake-up frame may be compatible with an IEEE 802.11 communication protocol.

Moreover, the interface circuit may receive feedback information (operation 214) associated with a second channel in a second band of frequencies, wherein the feedback information is associated with a main radio in the recipient electronic device. For example, the feedback information may include one or more of: a received signal strength in the channel in the band of frequencies at the wake-up radio; a link margin associated with the channel in the band of frequencies; a pathloss associated with the channel in the band of frequencies; and a transmit power of the main radio in the recipient electronic device for the second channel in the second band of frequencies. Note that the channel in the band of frequencies and the second channel in the second band of frequencies may be different.

Based at least in part on the feedback information, the interface circuit may estimate one or more communication metrics (operation 216) associated with the channel in the band of frequencies. For example, the one or more communication metrics may include at least one of: a signal-to-noise ratio associated with the channel in the band of frequencies, the received signal strength at the recipient electronic device in the channel in the band of frequencies and the pathloss in the channel in the band of frequencies.

Furthermore, based at least in part on the one or more communication metrics, the interface circuit may determine a data rate (operation 218) for use in communication via the channel in the band of frequencies.

In some embodiments, the interface circuit optionally performs one or more additional operations (operation 220). For example, the feedback information may, at least in part, include one or more second communication metrics associated with the channel in the band of frequencies, and the interface circuit may determine the data rate (operation 218) based at least in part on the one or more second communication metrics. Thus, communication performance associated with the channel in the band of frequencies may be estimated by the electronic device, the recipient electronic device or both.

Moreover, when the interface circuit does not receive the feedback information within a time interval of providing the wake-up frame, the interface circuit may reduce the data rate for use in communication via the channel in the band of frequencies.

Furthermore, the interface circuit may determine the data rate (operation 218) based at least in part on a predefined list of data rates as a function of at least one of the one or more communication metrics. For example, the predefined list may include data rates as a function of signal-to-noise ratios associated with the channel in the band of frequencies. Therefore, when determining the data rate, the interface circuit may perform a look-up operation in the predefined list, which may be stored in a computer-readable memory.

Figure 3:
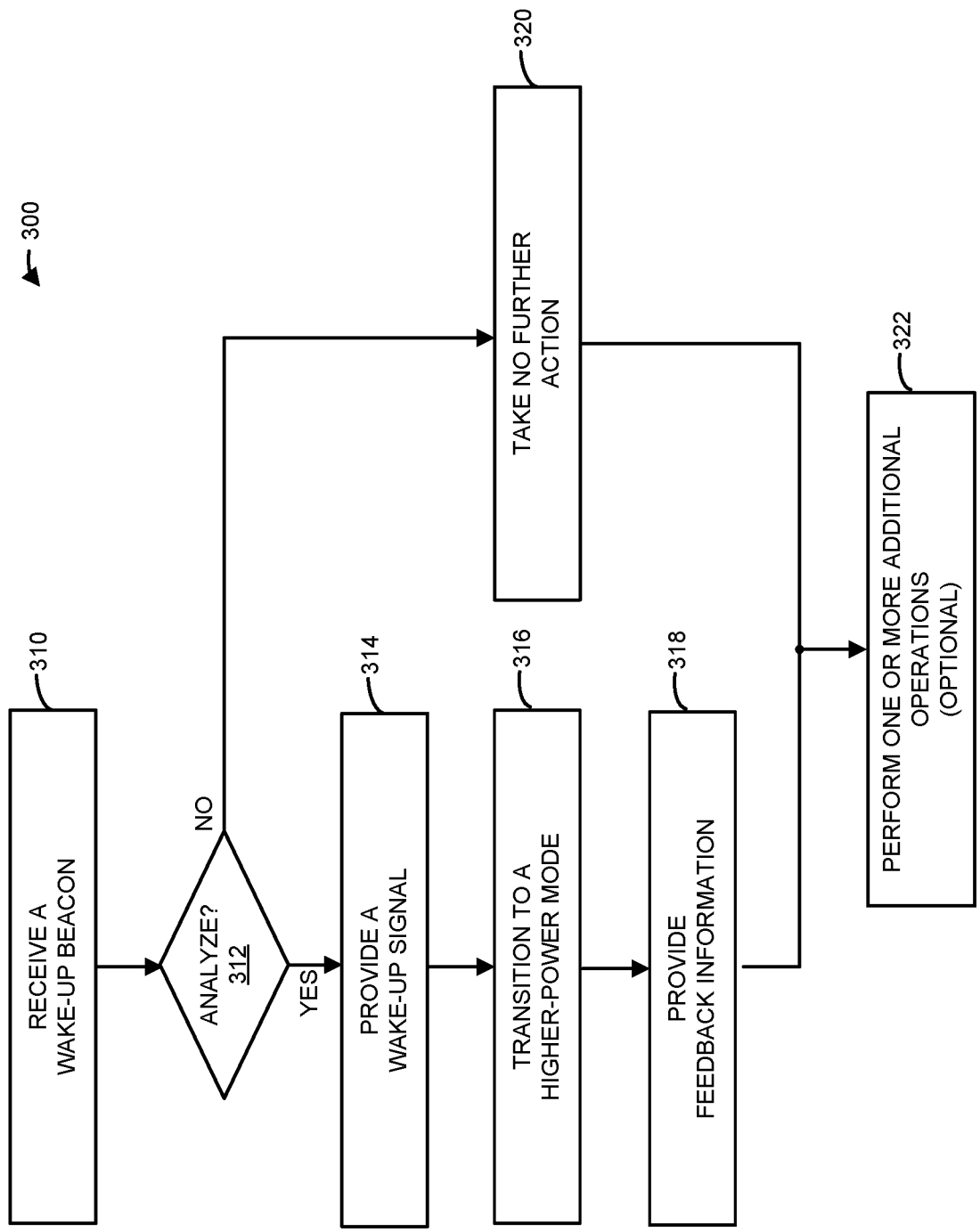
FIG. 3 is a flow diagram illustrating an example of a method for providing feedback information using one of the electronic devices in FIG. 1.

FIG. 3 presents a flow diagram illustrating an example method 300 for providing the feedback information. This method may be performed by a recipient electronic device, such as an interface circuit in electronic device 110-1 in FIG. 1. This interface circuit may include a wake-up radio and a main radio. During operation, the wake-up radio may receive the wake-up frame (operation 310) associated with the channel in the band of frequencies, where the wake-up frame is associated with the electronic device (such as from the electronic device). Then, the wake-up radio may optionally analyze the wake-up frame (operation 312) to determine whether to wake up the main radio. If yes (operation 312), the wake-up radio may provide, to the main radio, a wake-up signal (operation 314) that transitions (operation 316) the main radio from a low-power mode to a higher-power mode based at least in part on the wake-up frame. Moreover, the main radio may provide the feedback information (operation 318) for the electronic device, wherein the feedback information is associated with the second channel in the second band of frequencies. Otherwise (operation 312), the wake-up radio may not take further action (operation 320).

In some embodiments, the interface circuit optionally performs one or more additional operations (operation 322). For example, prior to providing the feedback information (operation 318), the interface circuit may determine the one or more second communication metrics associated with the channel in the band of frequencies. Notably, the feedback information may include one or more of: the received signal strength at the wake-up radio in the channel in the band of frequencies; the link margin associated with the channel in the band of frequencies; the pathloss associated with the channel in the band of frequencies; and the transmit power of the main radio in the second channel in the second band of frequencies.

In some embodiments of methods 200 (FIG. 2) and/or 300, there may be additional or fewer operations. Moreover, the order of the operations may be changed, and/or two or more operations may be combined into a single operation or performed at least partially in parallel.

In some embodiments, at least some of the operations in methods 200 (FIG. 2) and/or 300 are performed by an interface circuit in the electronic device. For example, at least some of the operations may be performed by firmware executed by an interface circuit, such as firmware associated with a MAC layer, as well as one or more circuits in a physical layer in the interface circuit.

Figure 4:
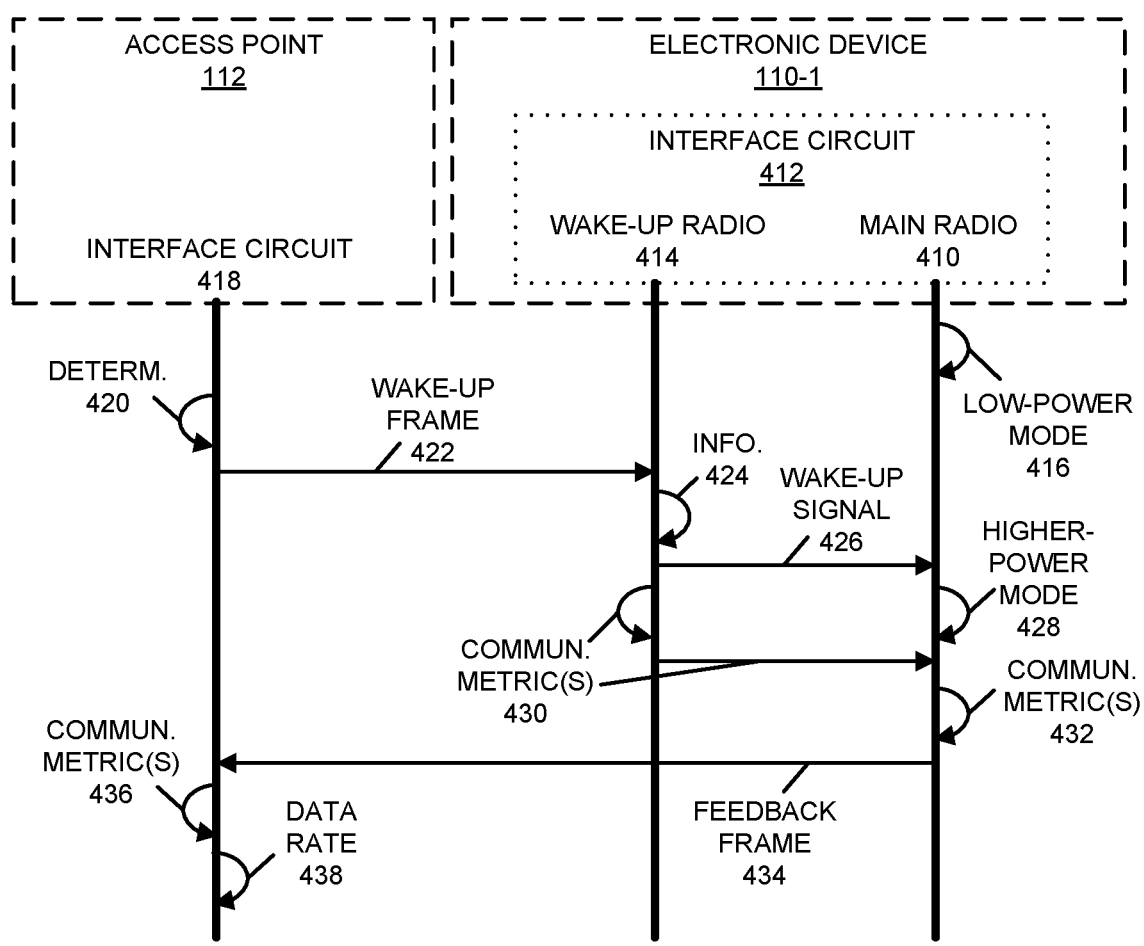
FIG. 4 is a flow diagram illustrating an example of communication between electronic devices, such as the electronic devices of FIG. 1.

The communication technique is further illustrated in FIG. 4, which presents a flow diagram illustrating an example of communication between electronic device 110-1 and access point 112. After associating with access point 112, main radio 410 in interface circuit 412 in electronic device 110-1 may transition to a low-power mode 416. Next, interface circuit 418 may determine 420 to provide wake-up frame 422 for a wake-up radio 414 (such as wake-up radio 118-1) in interface circuit 412. For example, interface circuit 418 may determine 420 to provide wake-up frame 422 when there is downlink traffic (such as data associated with a service) for electronic device 110-1. Moreover, interface circuit 418 may provide wake-up frame 422 associated with the channel in the band of frequencies.

After receiving wake-up frame 422, wake-up radio 414 may extract and analyze information 424. Then, wake-up radio 414 may perform a remedial action. For example, wake-up radio 414 may provide, to main radio 410, a wake-up signal 426 that transitions main radio 410 from low-power mode 416 to a higher-power mode 428 based at least in part on wake-up frame 422. Alternatively or additionally, wake-up radio 414 may optionally determine one or more communication metrics 430, which are provided to main radio 410.

Next, main radio 410 may optionally determine one or more communication metrics 432. Furthermore, main radio 410 may provide feedback frame 434 to interface circuit 418 in the second channel in the second band of frequencies. Note that feedback frame 434 may include the feedback information, such as the one or more communication metrics 430 and/or the one or more communication metrics 432.

After receiving feedback frame 434, interface circuit 418 may estimate one or more communication metrics 436 in the channel in the band of frequencies based at least in part on the feedback information. Furthermore, interface circuit 418 may determine a data rate 438 (such as a modulation coding scheme) for use in the communication via the channel in the band of frequencies.

Representative Embodiments

In some embodiments of the LP-WUR radio technology, the communication technique is used to perform link adaptation. Notably, in order to optimize coverage and transmission efficiency, multiple data rates may be used during communication with a WUR. However, when there are multiple data rates available, link adaptation (such as data-rate selection) typically needs to be performed at the transmit side (such as at an access point).

Figure 5:
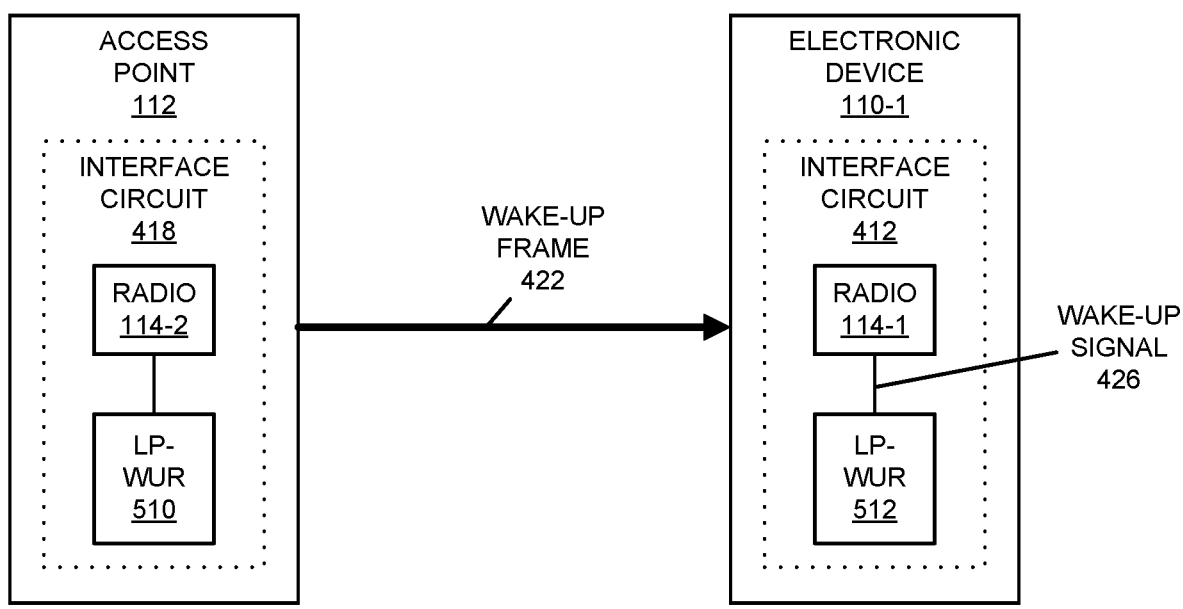
FIG. 5 is a drawing illustrating an example interface circuit in one of the electronic devices in FIG. 1.

A transmitting electronic device (such as an access point) may select a data rate based at least in part on received acknowledgements from a recipient electronic device. However, because the WUR may operate in a receive-only mode, an interface circuit in the access point may not receive an acknowledgment from the recipient electronic device through the WUR link. Moreover, even if the access point receives an acknowledgement from the main radio in the recipient electronic device, this acknowledgment may come a few hundred milliseconds later because of the main-radio wake-up delay. By that time, the channel situation in the WUR link may have already changed. Consequently, acknowledgment-based link adaptation may not work well. In addition, even if the access point can estimate the RSSI of the received packet from the main radio, the link between the access point and the recipient electronic device may not be symmetric. Furthermore, the main radio and the WUR may have different characteristics (and may operate in different channels and/or different bands of frequencies), so the estimation of RSSI from main radio uplink may not directly apply to WUR downlink data-rate selection In order to address these challenges, in the communication technique a LP-WUR or wake-up frame may be used to selectively wake-up the main radio in at least the recipient electronic device. As shown in FIG. 5, which presents a drawing illustrating an example of an interface circuit 412 in electronic device 110-1, in the communication technique a LP-WUR 512 (such as wake-up radio 414) may be a companion radio to a main (Wi-Fi) radio 114-1 in interface circuit 412. LP-WUR 512 may allow electronic device 110-1 to turn off main radio 114-1, e.g., whenever possible. Moreover, LP-WUR 512 may wake up main radio 114-1 when wake-up frame 422 (such as a LP-WUR packet), sent from optional LP-WUR 510 or radio 114-2 in access point 112, specifies electronic device 110-1. Note that in some embodiments LP-WUR 512 is configured to receive wireless signals, while main radio 114-1 is configured to transmit and to receive wireless signals. In these ways, the power consumption of LP-WUR 512 may be very low, e.g., lower than Bluetooth Low Energy. LP-WUR 512 can operate in an always-on mode and/or in a duty-cycle mode. For example, in the duty-cycle mode, LP-WUR 512 may turn on or listen for a wake-up frame from access point 112 based at least in part on a keep-alive interval of access point 112.

Figure 6:
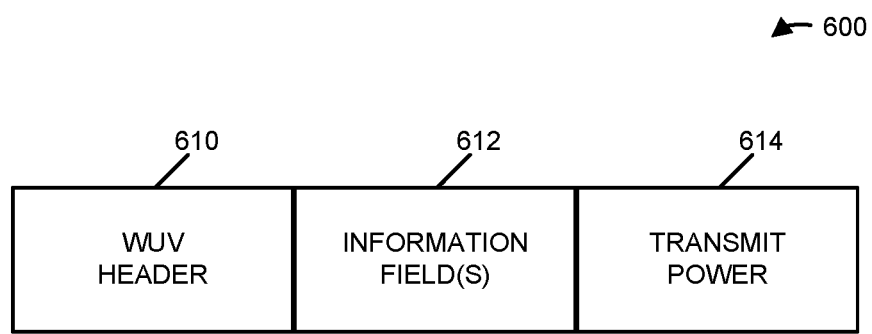
FIG. 6 is a drawing illustrating an example wake-up frame.

Moreover, in order to allow access point 112 to perform WUR link adaptation, a feedback frame (which is sometimes referred to as 'WUR feedback') may be defined. Notably, access point 112 may provide a wake-up frame to the recipient electronic device in response to a wake-up frame from access point 112. This is shown in FIG. 6, which presents a drawing illustrating an example of a wake-up frame 600 (which may be a special type of LP-WUR packet). Wake-up frame 600 may include a WUR header 610, one or more information fields 612 and optionally a transmit power 614 used by access point 112 in the channel in the band of frequencies. Note that transmit power 614 may help the recipient electronic device estimate pathloss in the channel in the band of frequencies. Moreover, the one or more information fields 612 may include service information and/or additional information. For example, the service information may include information such as a service identifier and/or a vendor identifier for a provider of a service. The service identifier may be defined for different services. Thus, the service identifier may specify one or more types of services. For example, a cable service may use a service identifier of '0000', a television service may use a service identifier '0001', etc. Note that at least some of the information in wake-up frame 600 (such as an SSID) may be hashed using a predefined hash function (e.g., the hash function may be defined in an IEEE standard, such as IEEE 802.11BA, so that access point 112 and electronic device 110-1 use the same hash function). This is because wake-up frame 600 may have a low data rate (e.g., the modulation may include on-off keying or OOK, or similar modulation that has a very low data rate, such as, e.g., 250 kbps). Therefore, the one or more information fields 612 may not include a large number of bits. Consequently, one or more hash functions may be used to reduce the number of bits that are needed. In other embodiments, the order of items in wake-up frame 600 can vary and additional and/or different items can be included.

Figure 7:
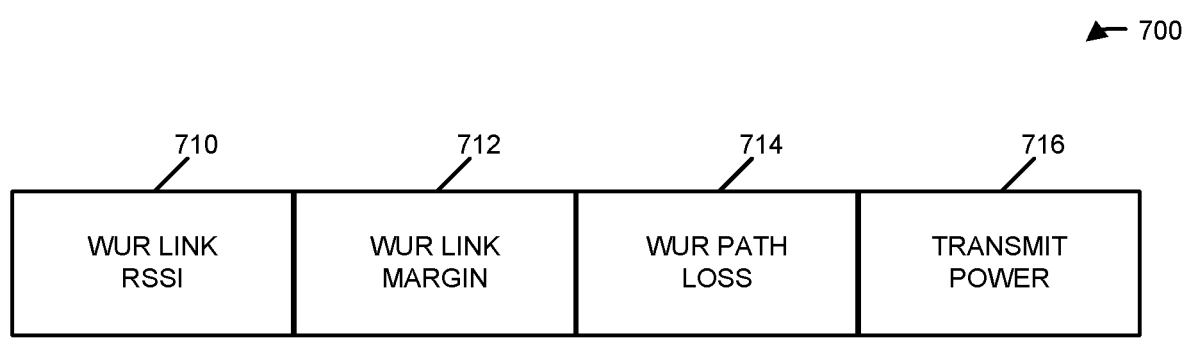
FIG. 7 is a drawing illustrating an example feedback frame.

Furthermore, the recipient electronic device may transmit the feedback frame as the first frame from the main radio as the first frame after it transitions to the higher-power mode. FIG. 7 presents a drawing illustrating an example of a feedback frame 700 (which may be a special type of LP-WUR packet). Note that feedback frame 700 may include: WUR link RSSI 710 to inform access point 112 of the RSSI received by the WUR in the channel in the band of frequencies; WUR link margin 712 to inform access point 112 of the link margin for the channel in the band of frequencies using the current data rate; optional WUR pathloss 714 in the channel in the band of frequencies; and/or optional transmit power 716 of the main radio in the second channel in the second band of frequencies. In other embodiments, the order of items in feedback frame 700 can vary and additional and/or different items can be included.

While the preceding example illustrated the feedback information in one or more fields in feedback frame 700, in some embodiments the feedback information is included in a header, such as a media access control (MAC) header (e.g., in a control field). In some embodiments, the MAC header is included in a data frame or a null frame.

Access point 112 may implement a data-rate adaptation policy associated with the communication technique. Notably, the communication technique may define a timeout interval after sending the wake-up frame. After this timeout interval, access point 112 may assume that the wake-up frame was not received by the recipient electronic device. If the feedback frame is not received from the main radio after the timeout interval, the access point may assume that the wake-up frame was lost and may reduce its data rate. In this case, because the access point does not receive a feedback frame in response to the wake-up frame, and therefore cannot use the feedback information. However, if the access point receives a feedback frame from the recipient electronic device within the timeout interval, then the access point can use the feedback information in the feedback frame to select the data rate in the next WUR transmission.

Because WUR and the main radio may operate on different channels and/or in different bands of frequencies, the access point may need to take into account the differences in pathloss when calculating the data rate for the downlink communication to the WUR. In some embodiments, access point 112 estimates one or more communication metrics in the channel in the band of frequencies and/or determines the data rate in the channel in the band of frequencies using one or more equations, including:

$$PL = C_1 \cdot \log 10(d) + C_2 \cdot \log 10(f) + C_3,$$

where PL is the pathloss, d is the distance, f is the carrier frequency in a given channel in a given band of frequencies, and $C_1$, $C_2$ and $C_3$ are constants that depend on the given channel in the given band of frequencies;

$$RSSI = Tx - PL,$$

where Tx is the transmit power in a given channel in a given band of frequencies;

$$RSNR = RSSI - RN,$$

where RSNR is the received SNR and RN is the receiver noise; and $$LM = RSNR - SNR_o,$$

where LM is the link margin and $SNR_o$ is the required SNR for the current data rate. Note that the preceding equations are in dBs.

Access point 112 may determine the data rate using one or more communication metrics in the following examples. Note that in these examples, access point 112 and/or the recipient electronic device may leverage a predefined or predetermined dataset with values of data rate versus signal-to-noise ratio or RSSI.

In a first example, based at least in part on the RSSI value of the received wake-up frame, the recipient electronic device may estimate the link margin in the channel in the band of frequencies for the current data rate. Moreover, the recipient electronic device may provide the estimated link margin in the feedback information in the feedback frame using the main radio. Based at least in part on the link margin in the feedback frame, access point 112 may check to see if the link margin is larger than the magnitude of the signal-to-noise-ratio difference from the current data rate to the next higher (or lower) data rate. If yes, access point 112 may scale up (or scale down) the data rate for the next wake-up frame for the recipient electronic device.

In a second example, the recipient electronic device may provide the RSSI in the channel in the band of frequencies to access point 112 in the feedback information in the feedback frame. Then, access point 112 may calculate the received signal-to-noise ratio at the recipient electronic device as the RSSI minus the receiver noise, where the receiver noise may be estimated by access point 112 (e.g., access point 112 may use its noise as an estimate of the noise in the WUR in the recipient electronic device).

In a third example, the recipient electronic device may estimate the pathloss based at least in part on a difference of the transmit power of access point 112 and the received RSSI value. Then, the recipient electronic device may include the estimated pathloss in the feedback information in the feedback frame. Next, access point 112 may estimate the RSSI (which is henceforth referred to as RSSI') if it decides to use a different transmit power as $$RSSI' = Tx - PL.$$

Moreover, access point 112 may estimate the SNR as RSSI' minus an estimate of the receiver noise (e.g., access point 112 may use its noise as an estimate of the noise in the WUR in the recipient electronic device).

In a fourth example, the recipient electronic device may provide the transmit power of the main radio in the feedback information in the feedback frame. Then, access point 112 may estimate the pathloss based at least in part on received RSSI and the transmit power of the recipient electronic device. Moreover, based at least in part on the estimated pathloss and the transmit power of access point 112, access point 112 may predict or map to the RSSI and/or the signal-to-noise ratio at the WUR in the recipient electronic device.

Thus, access point 112 may estimate one or more communication performance metrics associated with the channel in the band of frequencies based at least in part on feedback information communicated and/or associated with the second channel in the second band of frequencies.

As noted previously, using one or more of the communication metrics determined in the preceding examples, access point 112 may determine or select the data rate. For example, access point 112 may select a modulation coding scheme using a minimum value or an average value of the data rate based at least in part on the preceding examples.

In summary, in the communication technique a feedback frame may be used to help access point 112 (and, more generally, a transmitting electronic device) perform link adaption on a WUR link. The feedback frame can include feedback information, such as: RSSI, link margin, pathloss and/or transmit power. Access point 112 can use one or more options to estimate the best data rate based at least in part on the feedback information.

While access point 112 woke up main radio 114-1 using wake-up frame 422 in the preceding example, in some embodiments wake-up frame 422 may be used to wake up main radios (and, more generally, to convey information to) one or more recipient electronic devices. For example, during the communication technique, access point 112 may define a group of one or more recipient electronic devices and may use a single wake-up frame to wake up the main radios in the group of recipient electronic devices. However, the recipient electronic devices in the group may not all have traffic when the group wake-up frame is received. Consequently, the wake-up frame may include a group wake-up indication map (WIM) that is carried or conveyed in the wake-up frame. The group-WIM may be a bitmap that is used to indicate which recipient electronic devices are being awakened (such as a subset of the group of recipient electronic devices). For example, in some embodiments, if there are ten recipient electronic devices in a group, then the group-WIM may be, e.g., a 10-bit field. In other embodiments, other mapping schemes or techniques can be used.

In general, access point 112 may group recipient electronic devices into a wake-up group based at least in part on one or more criteria. For example, access point 112 may define a group based at least in part on recipient electronic devices that have similar keep-alive intervals and/or that have previously specific a common service for which they will wake up their main radios.

We now describe embodiments of an electronic device. FIG. 8 presents a block diagram of an electronic device 800 (which may be a cellular telephone, an access point, another electronic device, etc.) in accordance with some embodiments. This electronic device includes processing subsystem 810, memory subsystem 812, and networking subsystem 814. Processing subsystem 810 includes one or more devices configured to perform computational operations. For example, processing subsystem 810 can include one or more microprocessors, application-specific integrated circuits (ASICs), microcontrollers, graphics processing units (GPUs), programmable-logic devices, and/or one or more digital signal processors (DSPs).

Memory subsystem 812 includes one or more devices for storing data and/or instructions for processing subsystem 810 and networking subsystem 814. For example, memory subsystem 812 can include dynamic random access memory (DRAM), static random access memory (SRAM), a read-only memory (ROM), flash memory, and/or other types of memory. In some embodiments, instructions for processing subsystem 810 in memory subsystem 812 include: program instructions or sets of instructions (such as program instructions 822 or operating system 824), which may be executed by processing subsystem 810. For example, a ROM can store programs, utilities or processes to be executed in a non-volatile manner, and DRAM can provide volatile data storage, and may store instructions related to the operation of electronic device 800. Note that the one or more computer programs may constitute a computer-program mechanism, a computer-readable storage medium or software. Moreover, instructions in the various modules in memory subsystem 812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 810. In some embodiments, the one or more computer programs are distributed over a network-coupled computer system so that the one or more computer programs are stored and executed in a distributed manner.

In addition, memory subsystem 812 can include mechanisms for controlling access to the memory. In some embodiments, memory subsystem 812 includes a memory hierarchy that comprises one or more caches coupled to a memory in electronic device 800. In some of these embodiments, one or more of the caches is located in processing subsystem 810.

In some embodiments, memory subsystem 812 is coupled to one or more high-capacity mass-storage devices (not shown). For example, memory subsystem 812 can be coupled to a magnetic or optical drive, a solid-state drive, or another type of mass-storage device. In these embodiments, memory subsystem 812 can be used by electronic device 800 as fast-access storage for often-used data, while the mass-storage device is used to store less frequently used data.

Figure 8:
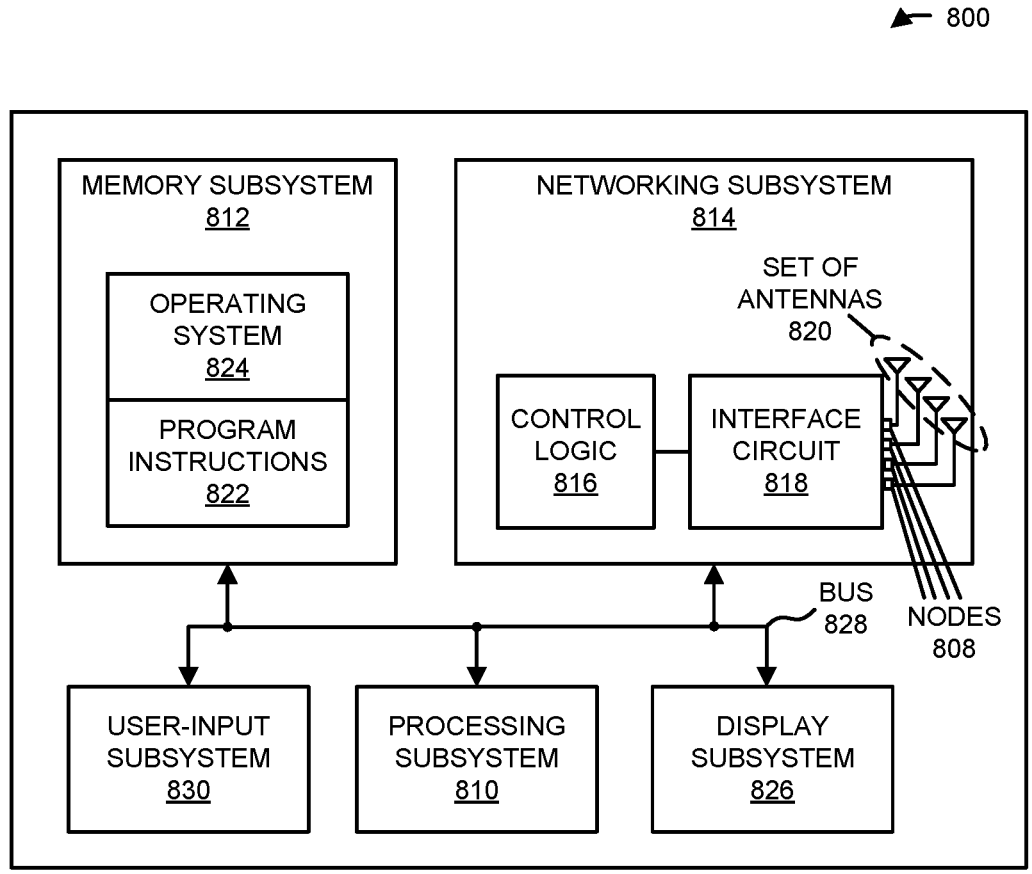
FIG. 8 is a block diagram illustrating an example of one of the electronic devices of FIG. 1.

Networking subsystem 814 includes one or more devices configured to couple to and communicate on a wired and/or wireless network (i.e., to perform network operations), including: control logic 816, an interface circuit 818 and a set of antennas 820 (or antenna elements) in an adaptive array that can be selectively turned on and/or off by control logic 816 to create a variety of optional antenna patterns or 'beam patterns.' (While FIG. 8 includes set of antennas 820, in some embodiments electronic device 800 includes one or more nodes, such as nodes 808, e.g., a pad, which can be coupled to set of antennas 820. Thus, electronic device 800 may or may not include set of antennas 820.) For example, networking subsystem 814 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

In some embodiments, networking subsystem 814 includes one or more radios, such as a wake-up radio that is used to receive wake-up frames, and a main radio that is used to transmit and/or receive frames or packets during a higher-power mode (such as the feedback frame). The wake-up radio and the main radio may be implemented separately (such as using discrete components or separate integrated circuits) or in a common integrated circuit.

Networking subsystem 814 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 800 may use the mechanisms in networking subsystem 814 for performing simple wireless communication between the electronic devices, e.g., transmitting advertising or frame frames and/or scanning for advertising frames transmitted by other electronic devices.

Within electronic device 800, processing subsystem 810, memory subsystem 812, and networking subsystem 814 are coupled together using bus 828 that facilitates data transfer between these components. Bus 828 may include an electrical, optical, and/or electro-optical connection that the subsystems can use to communicate commands and data among one another. Although only one bus 828 is shown for clarity, different embodiments can include a different number or configuration of electrical, optical, and/or electro-optical connections among the subsystems.

In some embodiments, electronic device 800 includes a display subsystem 826 for displaying information on a display, which may include a display driver and the display, such as a liquid-crystal display, a multi-touch touchscreen, etc. Display subsystem 826 may be controlled by processing subsystem 810 to display information to a user (e.g., information relating to incoming, outgoing, or an active communication session).

Electronic device 800 can also include a user-input subsystem 830 that allows a user of the electronic device 800 to interact with electronic device 800. For example, user-input subsystem 830 can take a variety of forms, such as: a button, keypad, dial, touch screen, audio input interface, visual/image capture input interface, input in the form of sensor data, etc.

Electronic device 800 can be (or can be included in) any electronic device with at least one network interface. For example, electronic device 800 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 800, in alternative embodiments, different components and/or subsystems may be present in electronic device 800. For example, electronic device 800 may include one or more additional processing subsystems, memory subsystems, networking subsystems, and/or display subsystems. Additionally, one or more of the subsystems may not be present in electronic device 800. Moreover, in some embodiments, electronic device 800 may include one or more additional subsystems that are not shown in FIG. 8. Also, although separate subsystems are shown in FIG. 8, in some embodiments some or all of a given subsystem or component can be integrated into one or more of the other subsystems or component(s) in electronic device 800. For example, in some embodiments program instructions 822 are included in operating system 824 and/or control logic 816 is included in interface circuit 818.

Moreover, the circuits and components in electronic device 800 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 814. This integrated circuit may include hardware and/or software mechanisms that are used for transmitting wireless signals from electronic device 800 and receiving signals at electronic device 800 from other electronic devices. Aside from the mechanisms herein described, radios are generally known in the art and hence are not described in detail. In general, networking subsystem 814 and/or the integrated circuit can include any number of radios. Note that the radios in multiple-radio embodiments function in a similar way to the described single-radio embodiments.

In some embodiments, networking subsystem 814 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 822, operating system 824 (such as a driver for interface circuit 818) or in firmware in interface circuit 818. Alternatively or additionally, at least some of the operations in the communication technique may be implemented in a physical layer, such as hardware in interface circuit 818. In some embodiments, the communication technique is implemented, at least in part, in a MAC layer and/or in a physical layer in interface circuit 818.

While examples of numerical values are provided in the preceding discussion, in other embodiments different numerical values are used. Consequently, the numerical values provided are not intended to be limiting.

While the preceding embodiments illustrated the use of a wake-up frame that is communicated using Wi-Fi, in other embodiments of the communication technique Bluetooth Low Energy is used to communicate the wake-up frame. Furthermore, the wake-up frame may be communicated in the same or a different band of frequencies that the band(s) of frequencies used by the main radio. For example, the wake-up frame and/or the feedback frame may be communicated in one or more bands of frequencies, including: 900 MHz, 2.4 GHz, 5 GHz, 60 GHz, and/or a band of frequencies used by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
a pad configured to communicatively couple to an antenna; and
an interface circuit, communicatively coupled to the pad, configured to communicate with a recipient electronic device, and configured to:
provide a wake-up frame associated with a channel in a band of frequencies, wherein the wake-up frame is intended for a wake-up radio in the recipient electronic device;
receive feedback information about a second channel in a second band of frequencies and associated with communication between the electronic device and the recipient electronic device, wherein the feedback information is associated with a main radio in the recipient electronic device;
estimate, based at least in part on the feedback information, one or more communication metrics associated with the channel in the band of frequencies and associated with the communication between the electronic device and the recipient electronic device; and
determine, based at least in part on the one or more communication metrics, a data rate for use in communication via the channel in the band of frequencies.

2. The electronic device of claim 1, wherein the electronic device comprises an access point.

3. The electronic device of claim 1, wherein the wake-up frame comprises a Low Power Wake Up Radio (LP-WUR) packet.

4. The electronic device of claim 1, wherein the feedback information comprises, at least in part, one or more second communication metrics associated with the channel in the band of frequencies; and
wherein the interface circuit is configured to determine the data rate based at least in part on the one or more second communication metrics.

5. The electronic device of claim 1, wherein the feedback information comprises one or more of: a received signal strength at the wake-up radio associated with the channel in the band of frequencies; a link margin associated with the channel in the band of frequencies; a pathloss associated with the channel in the band of frequencies; or a transmit power of the main radio in the recipient electronic device associated with the second channel in the second band of frequencies.

6. The electronic device of claim 1, wherein the channel in the band of frequencies and the second channel in the second band of frequencies are different.

7. The electronic device of claim 1, wherein, when the interface circuit does not receive the feedback information within a time interval of providing the wake-up frame, the interface circuit is configured to reduce the data rate for use in communication via the channel in the band of frequencies.

8. The electronic device of claim 1, wherein the interface circuit determines the data rate based at least in part on a predefined list of data rates as a function of at least one of the one or more communication metrics.

9. The electronic device of claim 8, wherein the predefined list comprises data rates as a function of signal-to-noise ratios associated with the channel in the band of frequencies.

10. The electronic device of claim 1, wherein the one or more communication metrics comprise at least one of: a signal-to-noise ratio associated with the channel in the band of frequencies, the received signal strength at the recipient electronic device associated with the channel in the band of frequencies, or pathloss associated with the channel in the band of frequencies.

11. A recipient electronic device, comprising:
a pad configured to communicatively couple to an antenna; and
an interface circuit, communicatively coupled to the pad, configured to communicate with an electronic device, wherein the interface circuit comprises a wake-up radio and a main radio, and wherein the wake-up radio is configured to:
receive a wake-up frame associated with a channel in a band of frequencies, wherein the wake-up frame is associated with the electronic device; and
provide, to the main radio, a wake-up signal that transitions the main radio from a low-power mode to a higher-power mode based at least in part on the wake-up frame; and wherein the main radio is configured to:
provide, after transitioning to the higher-power mode, feedback information intended for the electronic device, wherein the feedback information is about a second channel in a second band of frequencies, and wherein the feedback information comprises, at least in part, one or more communication metrics associated with the second channel in the second band of frequencies and associated with communication between the electronic device and the recipient electronic device; and when the main radio is subsequently in the low-power mode, the wake-up radio is configured to receive a second wake-up frame associated with the channel in the band of frequencies, wherein the wake-up frame is associated with the electronic device and has a data rate that is based at least in part on one or more estimated communication metrics of the channel corresponding to the feedback information.

12. The recipient electronic device of claim 11, wherein the electronic device comprises an access point.

13. The recipient electronic device of claim 11, wherein the wake-up frame comprises a Low Power Wake Up Radio (LP-WUR) packet.

14. The recipient electronic device of claim 11, wherein the wake-up frame is compatible with an IEEE 802.11 communication protocol.

15. The recipient electronic device of claim 11, wherein, prior to providing the feedback information, the interface circuit is configured to determine the one or more communication metrics.

16. The recipient electronic device of claim 11, wherein the channel in the band of frequencies and the second channel in the second band of frequencies are different.

17. A method for providing feedback information, comprising:
by a recipient electronic device:
receiving, using a wake-up radio in the recipient electronic device, a wake-up frame associated with a channel in a band of frequencies, wherein the wake-up frame is associated with an electronic device;
providing, to a main radio in the recipient electronic device, a wake-up signal that transitions the main radio from a low-power mode to a higher-power mode based at least in part on the wake-up frame;
providing, to the main radio, the feedback information intended for the electronic device, wherein the feedback information is about a second channel in a second band of frequencies,
wherein the feedback information is provided after the main radio transitions to the higher-power mode, and
wherein the feedback information comprises, at least in part, one or more communication metrics associated with the second channel in the second band of frequencies and associated with communication between the electronic device and the recipient electronic device; and
when the main radio is subsequently in the low-power mode, receiving, using the wake-up radio, a second wake-up frame associated with the channel in the band of frequencies, wherein the wake-up frame is associated with the electronic device and has a data rate that is based at least in part on one or more estimated communication metrics of the channel corresponding to the feedback information.

18. The method of claim 17, wherein the wake-up frame is compatible with an IEEE 802.11 communication protocol.

19. The method of claim 17, wherein the method comprises, prior to providing the feedback information, determining the one or more communication metrics.

20. The method of claim 17, wherein the wake-up frame comprises a Low Power Wake Up Radio (LP-WUR) packet.

21. The electronic device of claim 1, wherein the feedback information comprises one or more of: a link margin associated with the channel in the band of frequencies; a pathloss associated with the channel in the band of frequencies; or a transmit power of the main radio in the recipient electronic device associated with the second channel in the second band of frequencies.

* * * * *